United States Patent [19]

Kaplan

[11] Patent Number: 5,841,600
[45] Date of Patent: Nov. 24, 1998

[54] RANDOMLY ORDERED DATA BLOCK ENVELOPE TAPE FORMAT

[75] Inventor: Lawrence Kaplan, Marlboro, Mass.

[73] Assignee: Quantum Corporation, Milpitas, Calif.

[21] Appl. No.: 584,652

[22] Filed: Jan. 11, 1996

[51] Int. Cl.$^6$ ........................................ G11B 5/09
[52] U.S. Cl. ................................. 360/48; 360/53
[58] Field of Search ................... 360/48, 53, 40; 371/37.1, 40.1, 40.2, 48; 386/47, 51, 56; 395/183.2

[56] References Cited

U.S. PATENT DOCUMENTS

| | | | |
|---|---|---|---|
| 4,637,023 | 1/1987 | Lounsbury et al. | 371/38 |
| 5,324,926 | 6/1994 | Horiguchi et al. | 235/494 |
| 5,325,370 | 6/1994 | Cleveland et al. | 371/37.4 |
| 5,592,342 | 1/1997 | Hall et al. | 360/48 |
| 5,598,388 | 1/1997 | Van Maren et al. | 360/48 |

FOREIGN PATENT DOCUMENTS

| | | | |
|---|---|---|---|
| 0 504 801 A2 | 9/1992 | European Pat. Off. | G11B 20/18 |
| WO 93/17426 | 9/1993 | WIPO | G11B 20/18 |

Primary Examiner—Aristotelis M. Psitos
Assistant Examiner—Regina Y. Neal
Attorney, Agent, or Firm—David B. Harrison

[57] ABSTRACT

A method of writing data onto a magnetic tape storage medium in the form of data blocks and error correction code blocks. Data is received from a data source and formatted into data and error correction code blocks. Data entities are created from the data and error correction code blocks. Data envelopes are defined to include one or more such data entities. The data envelopes are sequentially written onto the magnetic tape medium. The data and error correction blocks within the data envelopes may be arranged in any order without regard to the physical channel or positional placement. Blocks containing user data and those containing internally generated error recovery information are freely intermixed with random duplications allowed. Block placement topology heuristics can be freely applied within envelopes, and are typically driven by error handling considerations. Block write errors are repeated and migrated into other data channels as necessary. Blocks within data envelopes are reordered when read from the magnetic tape storage medium and missing blocks are recovered according to conventional error recovery schemes. Data envelopes are well ordered thus providing data checkpointing, logical data append functionality, and overall synchronization.

9 Claims, 4 Drawing Sheets

RANDOMLY ORDERED DATA BLOCK ENVELOPE TAPE FORMAT

BACKGROUND OF THE INVENTION

This invention relates in general to magnetic tape storage. More particularly this invention relates to a method for writing data onto magnetic tape.

Conventional magnetic tape storage devices store data on magnetic tape in the form of blocks of data using conventional read-after-write heads. Conventional magnetic tape media block topologies require well ordered and sequential block placement on the magnetic tape storage medium.

Such conventional magnetic tape media block topologies suffer from two undesirable characteristics. First, the conventional read-after-write configuration coupled with the required data block sequentiality results in storage capacity loss whenever block re-writes are necessary due to write errors. Second, existing magnetic tape media block topologies do not readily permit continued writing if a read/write channel problem or localized media anomaly arises.

The present invention is directed to overcoming, or at least reducing the effects of, one or more of the problems set forth above. In particular, the present invention provides a method of writing data onto a magnetic tape storage media in the form of data envelopes which include one or more data entities. The data entities each include data blocks and error correction code (ECC) blocks. The storage of data blocks and ECC blocks of the data entities contained within the data envelopes can be in any order. The resulting block storage topology eliminates most of the storage capacity loss due to re-writes of data and ECC blocks. The resulting block storage topology also permits continued writing of data and ECC blocks, despite the presence of read/write channel problems and/or localized media anomalies, by migrating blocks onto other good channels or away from media aberrations. Thus the present invention provides a significant improvement in tape storage capacity and overall reliability is enhanced.

SUMMARY OF THE INVENTION

In accordance with one aspect of the present invention, a method of writing data onto a magnetic tape storage medium in the form of data blocks is provided in which data is received from a data source, the data received is formatted into data and ECC blocks, data entities are then created which include the data blocks and ECC blocks, data envelopes are then defined which include one or more of the data entities, and the data envelopes are written onto the magnetic tape storage medium in sequential fashion. The data and ECC blocks within the data envelopes can be randomly placed and do not require sequential placement on the tape medium.

DETAILED DESCRIPTION OF SPECIFIC EMBODIMENTS

Figure 1:
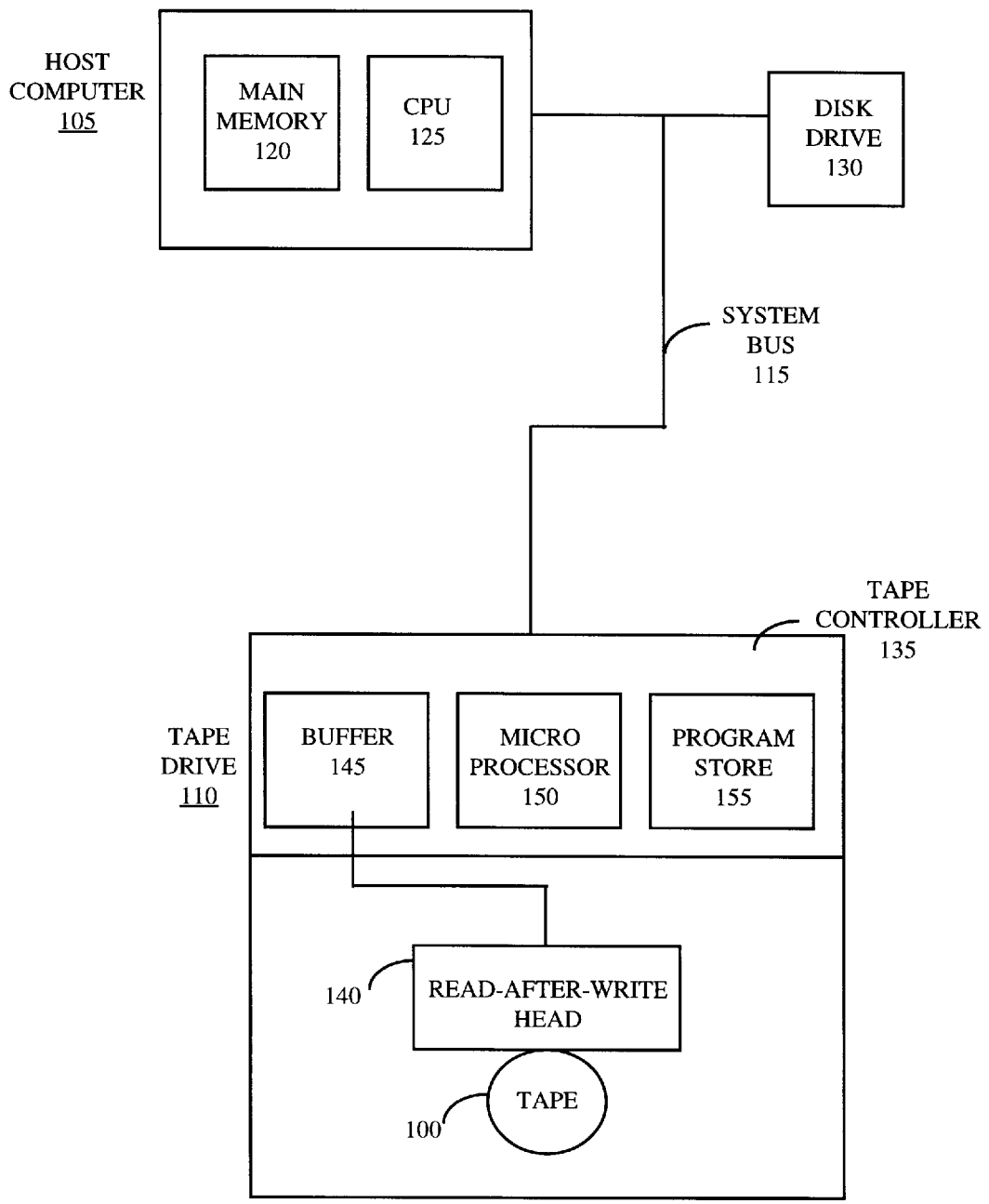
FIG. 1 is a block diagram of a host computer operably coupled to a tape drive by a system bus.

The following descriptions of illustrative embodiments of the invention are presented as lists of operations performed in illustrative methods, annotated with the explanatory notes below. The descriptions are derived from certain claims in the application as originally filed, but of course the claims are not intended and should not be deemed to be limited to the illustrative embodiment so described. Bracketed numbers correspond to the notes below, while unbracketed reference numerals correspond to identifying numerals in the drawings.

It is to be understood that the particular implementations described are intended as illustrations of, and not as limiting the scope of, the claims. In the interest of clarity, not all the routine features of the implementations are described. It will of course be appreciated that in the development of any such actual implementation, numerous implementation-specific decisions must be made to achieve the developers' specific goals such as compliance with system- and business-related constraints and that these goals will vary from one implementation to another. Moreover, it will be appreciated that such a development effort might be complex and time-consuming, but would nevertheless be a routine undertaking of engineering for those of ordinary skill having the benefit of this disclosure.

Illustrative Method

FIGS. 1–4 show the context of an illustrative method of writing data onto a magnetic tape storage medium 100 using a host computer 105 operably coupled to a tape drive 110 by a system bus 115. The illustrative method generally comprises:

(a) receiving data from a data source;

(b) formatting the data into data blocks and error correction code blocks, referred to as ECC blocks;

(c) creating at least one data entity, each data entity including data blocks and ECC blocks;

(d) defining at least one data envelope, each data envelope including at least one of the data entities; and (e) writing the data envelopes sequentially onto the magnetic tape storage medium.

Figure 3:
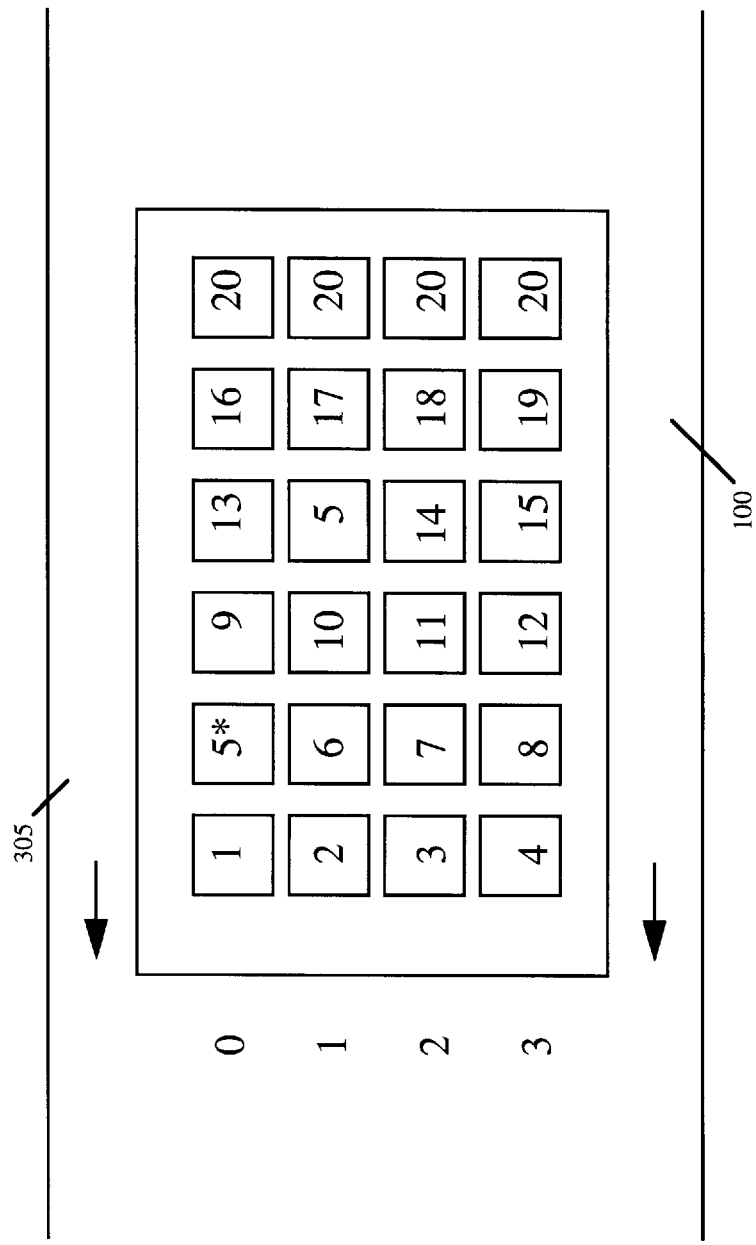
FIG. 3 illustrates block migration within a data envelope.

Referring to FIG. 3, the illustrative method of writing the data envelopes sequentially onto the magnetic tape storage medium may provide error correction within individual data envelopes that includes:

(1) detecting an error in a data or ECC block previously written on a specified channel; and (2) rewriting the data or ECC block in error onto the next circularly adjacent channel.

Figure 4:
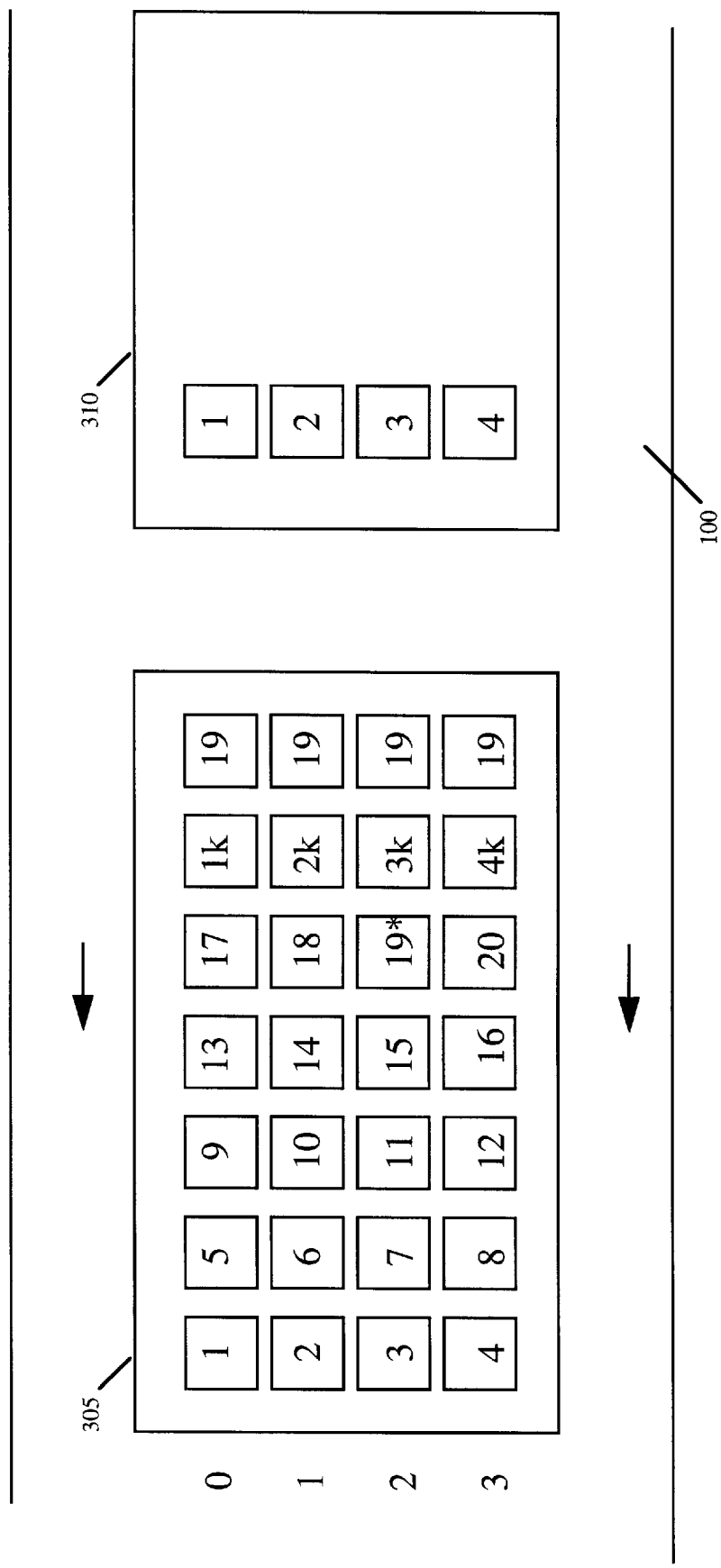
FIG. 4 illustrates envelope closure.

Referring to FIG. 4, the illustrative method of writing the data envelopes sequentially onto the magnetic tape storage medium may also provide error correction during envelope closure that includes:

(1) initiating the next data envelope by writing data and/or ECC blocks;

(2) detecting an error in a data or ECC block previously written on a specified channel in the previous data envelope;

(3) killing the blocks written in the next data envelope; and (4) rewriting the data or ECC blocks in error into the previous data envelope.

Notes to Illustrative Method

The method advantageously increases the storage capacity of a magnetic tape or other similar storage medium, permitting more data to be stored on a given amount of tape.

Generally speaking, it does so by reducing the storage space loss that conventionally arises from errors in encoding the data onto the tape. In addition, the method allows data recording to be continued even in the event of a localized media anomaly (e.g., contamination) or data-channel malfunction (due, e.g., to tape-head damage, problems with the read-write circuit.

In the illustrative embodiment, the magnetic tape storage medium is a four-channel magnetic tape 100 with channels 0, 1, 2, and 3. Of course any magnetic or nonmagnetic storage medium (e.g., optical tape) may used with any number of read-write channels providing that the medium is sequential with read-after-write error detection.

In the illustrative embodiment, the host computer 105 includes a main memory 120, a CPU 125, and a disk drive 130. The CPU 125 may be a general purpose programmable computer or any number of commercially available microprocessors as will be recognized by a person of ordinary skill in the art. The CPU 125 retrieves data from the main memory 120 and/or the disk drive 130 for transmission to the tape drive 110 over the system bus 115. The operation and mechanics of programming such a CPU 125 to send and receive such data over the system bus 115 are considered well known to a person of ordinary skill in the art.

In the illustrative embodiment, the tape drive 110 includes a tape controller 135 and a conventional read-after-write head 140. The tape controller 135 may include a buffer 145, a microprocessor 150, and program storage 155. The microprocessor 150 may be programmed to perform the method of the illustrative embodiment using industry standard programming languages such as, for example, assembly language, pascal, fortran, and C++. The programming may be encoded in an otherwise conventional program storage device such as, for example, a PROM , EEPROM, or flash memories. The read-after-write head 140 is controlled by the tape drive 110 using conventional servo-loop control. More generally, the storage medium may be any sequential storage medium with read-after-write capability. Therefore the present method may be adapted to encompass such storage media as, for example, optical tape storage with the "tape drive" replaced with analogous optical components to accommodate such alternative storage media as will be apparent to one of ordinary skill in the art. In addition, the control provided by the tape drive 110 may be provided by software resident in a microprocessor resident in the tape drive 100 or it may be augmented or replaced by a programmed logic array or other similar hardware implementation as will be apparent to one of ordinary skill in the art.

In the illustrative embodiment, the system bus 115 may comprise any number of industry standard serial or parallel communication busses.

In the illustrative embodiment, the data source will be the main memory 120, CPU 125, or disk drive 130. Other data sources may also be used as will be apparent to one of ordinary skill in the art.

Figure 2:
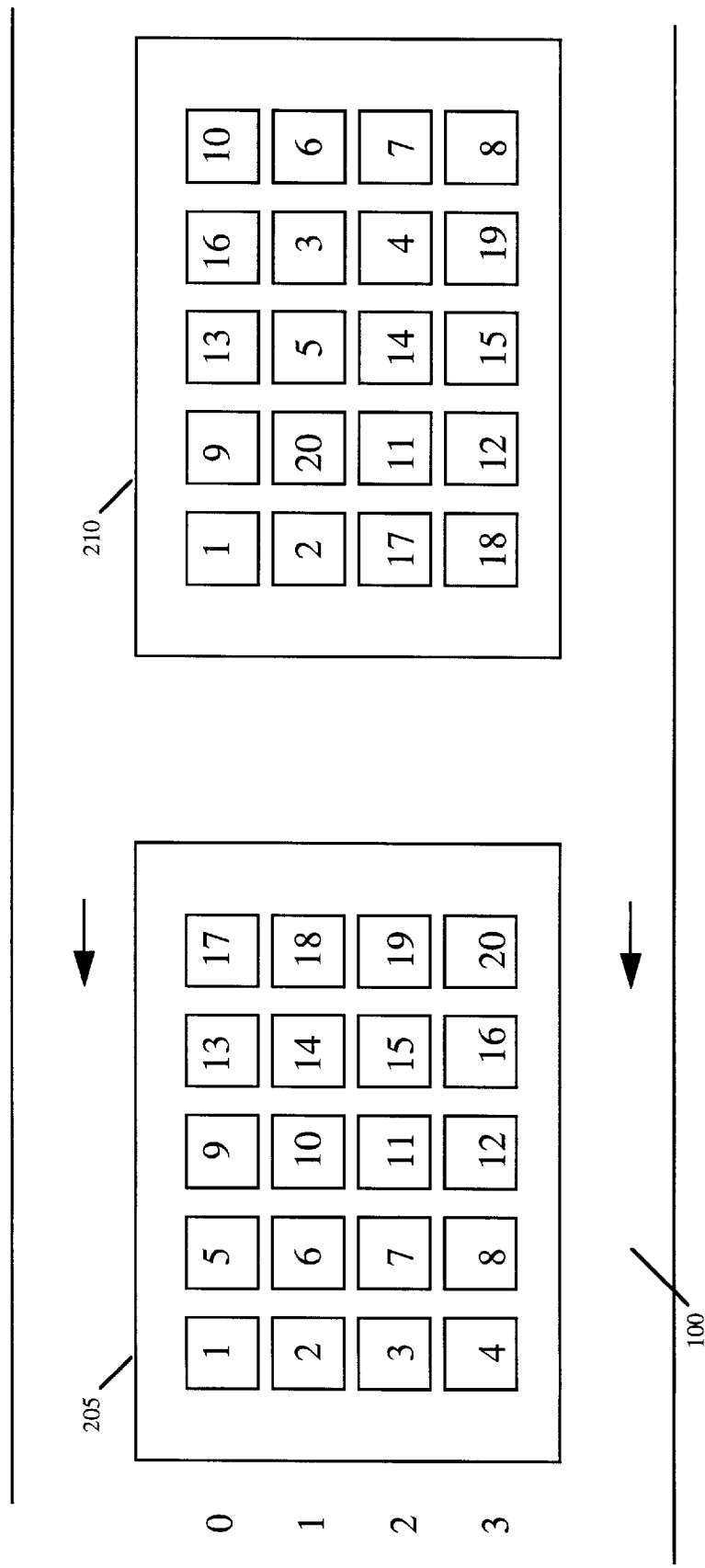
FIG. 2 illustrates a sequence of data envelopes on a magnetic tape storage medium each including one or more data blocks.

Data arriving from the host computer 105 are broken down into substantially uniform fixed size data blocks by software resident in the microprocessor 150. In the illustrative embodiment, sixteen such sequentially received data blocks are grouped together and four ECC blocks are also generated. This generation is done prior to writing the any of data blocks to tape. The resulting twenty blocks are called an entity. As illustrated in FIG. 2, one entity containing sixteen data blocks (numbered 1–16) and four ECC blocks (numbered 17–20) are sequentially packaged into a first data envelope 205 while another entity containing sixteen data blocks (numbered 1–16) and four ECC blocks (numbered 17–20) are non-sequentially packaged into a second, and sequentially positioned, data envelope 210. Although the illustrative embodiments only show a single entity in the envelopes, an envelope may contain any number of entities, but is governed by a practical implementation-wide maximum. Entities always exist within a single envelope and are not split or segmented between envelopes. The data envelopes 205 and 210 may contain any number of entities with the blocks of the entities contained within the data envelopes freely positioned within the data envelope (i.e. sequential ordering of the blocks is not required and the blocks of the plurality of entities within a specific data envelope may be freely intermixed).

A significant advantage of the present method is that the ECC blocks are created prior to writing the data blocks onto the tape 100. This has the effect of permitting the data blocks and ECC blocks to be written to the tape media 100 in an essentially arbitrary order. This represents a considerable improvement over prior techniques in which the ECC blocks were required to be written to the tape media after the data blocks were written. In addition, the prior techniques required the data blocks and the ECC blocks to be written sequentially and in the correct order. The prior techniques' requirement of sequentiality and ordering led to data capacity loss when block errors occurred because blocks that had originally been written sequentially were required to be rewritten sequentially in the original order. The present method, by contrast, permits the writing of blocks in any order.

One format for the data blocks is an adaptation of that used in existing products such as, for example, the DLT-2000, manufactured by the Quantum Corporation and further described in the ECMA Standard No. 209, published in December of 1994. Other types of data block formatting, which is driven by the particular platform selected, may also be utilized as will be recognized by persons of ordinary skill in the art.

One format for the ECC blocks is disclosed in U.S. Pat. No. 5,107,506, issued on Apr. 21, 1992, to Weng et al., the disclosure of which is incorporated wherein by reference. Other types of ECC formatting may also be utilized as will be recognized by persons of ordinary skill in the art.

In the illustrative embodiment, sixteen data blocks and four ECC blocks are used in each entity. More generally, any number and combination of data and ECC blocks may be utilized depending upon the specific error correction algorithm selected.

The blocks within an envelope are tagged with control fields identifying the particular data envelope in which they are contained. In this manner, the data envelopes may be sequentially ordered while the blocks within may be ordered in any fashion desired (e.g., sequential, random, ordered, chaotic, or some other pseudo-ordered arrangement).

The data envelopes may include from one up to any number of entities. In the illustrative embodiment, the data entities include data blocks and ECC blocks of substantially uniform size. More generally, it is possible for the data entities to not include ECC blocks and also to utilize blocks of non-uniform size.

The data envelopes are written onto the magnetic tape media in sequential order while the blocks within the data envelopes may be in any order. Blocks from any of the entities within a defined envelope may be written to tape 100 in any order and may be freely repeated within the envelope.

An error of any block detected by the read-after-write circuitry will be migrated onto the next circularly adjacent channel. All blocks within a defined envelope are completely written to media (error free) before the next envelope is started. The boundary between consecutive envelopes is called the envelope closure. During envelope closure, errors detected will result in any blocks currently being written to tape 100 from the next envelope to be killed ("k-bitted") so that inter-envelope sequentiality can be maintained.

The write logic is responsible for enforcing the block topology as well as the rules governing envelope closure. It is also responsible for making heuristic decisions regarding block migration and error management. Read operations are responsible for reordering the blocks within a specified envelope prior to transmitting them back to the host computer 105.

The storage medium in the illustrative embodiment is a four-channel magnetic tape 100 with read-write channels 0, 1, 2, and 3. The term "writing onto" a magnetic tape will of course be recognized to mean that certain particulate matter on the flexible tape substrate is selectively magnetized.

Detecting an error in a previously written block is provided by the conventional operation of read-after-write. In the illustrative embodiment illustrated in FIG. 3, the data envelope 305 includes block 5\* with errors. The error in block 5\* is detected during the subsequent conventional read-after-write operation.

Rewriting the block 5\* to the next circularly adjacent channel means writing the block again to another adjacent channel. In the illustrative embodiment, the block 5\* was initially written to channel 0 and is then subsequently rewritten to the circularly adjacent channel 1. Note that the final block number 20 of the data envelope 305 is written onto all four channels to finish out the data envelope 305. This is not required, but for a four-channel read-write head, as a matter of convenience, it is practical to write any remaining data to all four channel locations to finish out the data envelope.

FIG. 4 illustrates the error correction during envelope closure. A first data envelope 305 including blocks 1–20 are initially written onto the magnetic tape medium 100. The second data envelope 310 is then begun by writing blocks 1–4.

During the writing of blocks 1–4 of the second data envelope 310, the conventional read-after-write operation detects an error in block 19\*.

The initial blocks numbered 1–4 of the second data envelope 310 are then killed by being "k-bitted." K-bitting a block entails using a control bit in a control field which marks all of the blocks as bad thereby indicating subsequent read operations to ignore. The "killing" of the initial blocks of the second data envelope 310 is required because, while blocks within the data envelopes may be in any order, the blocks within the second data envelope 310 must be sequential to the blocks within the first data envelope 305. Consequently, the first data envelope 305 must be completed before the second data envelope 310 can begin.

The first data envelope 305 is then completed by writing the bad block 19\* again. Note that for the case of error correction during envelope closure, the rewriting can be to any is channel (i.e., channel circularity is not required). Once the first data envelope 305 is completed by rewriting the block 19, the second data envelope 310 can then begin again by writing the blocks 1–4.

The illustrative method and its numerous variations offers several significant advantages over the prior techniques employed for block topology:

(1) Errors detected within an envelope result in the block in error being rewritten, but no other blocks are killed or rewritten. Thus the illustrative method is extremely capacity-efficient.

(2) Errors detected at the envelope boundary result in some capacity loss, but these errors encompass only a small percentage of all errors ordinarily encountered in practice.

(3) Block migration allows continued writing of the magnetic tape storage medium during temporary read-write channel problems or contaminations of localized media perturbations. Thus the overall likelihood of a fatal write error is dramatically reduced.

(4) The architecture is essentially independent of the number of channels and can be implemented to be easily scalable onto future products.

(5) The architecture encapsulates all knowledge and maintenance of envelopes and their associated control so that only a single software module has responsibility for the block topology. The higher layers of the software—the bus handlers, servers, and the host programs—need have no inherent knowledge of the block topology and thus are isolated from it. The entire scheme is thus highly transportable and scales onto future designs.

It will be appreciated by those of ordinary skill having the benefit of this disclosure that numerous variations from the illustrations in the notes will be possible without departing from the inventive concept described herein.

What is claimed is:

1. A method for arranging user data blocks into substantially rectangular, variable length data envelopes enclosing plural lineal recording tracks of a magnetic storage tape moving across plural read-after-write tape heads of a head structure of a multi-channel data storage system including a tape transport mechanism for transporting the tape and positioning the head structure laterally relative to a direction of movement of the tape, a controller for controlling data flow within the data storage system, an interface for receiving user data from a host computer, and a buffer memory for temporary storage of received blocks of user data, the method comprising the steps of:

a. storing a sequence of user data blocks received from the host via the interface into the buffer memory, b. generating error correction code blocks from the user data blocks, c. simultaneously writing a plurality of rows of the user data blocks and the error correction code blocks in a block arrangement comprising a preliminary data envelope having rows of substantially equal length, d. reading each of the blocks of the preliminary data envelope immediately following writing thereof to determine if any uncorrectable errors are present in a said block of a particular row, e. if an uncorrectable error is found to be present in a said block, (1) extending the length of the preliminary data envelope by rewriting the block determined to contain the error at least to a different row than the particular row and rewriting such other blocks as may be needed to maintain said rows of substantially equal length within said length-extended preliminary data envelope, (2) read verifying the reordered data blocks to determine that no uncorrectable error remains present, and, (3) closing the length-extended preliminary data envelope as a present envelope, and e. if an uncorrectable error is not found to be present in a said data block, closing the preliminary data envelope as the present envelope.

2. The method of claim 1, wherein said data blocks and said error correction code blocks are arranged within said data envelopes in sequential order.

3. The method of claim 1, wherein said data blocks and said error correction code blocks are arranged within said data envelopes in nonsequential order.

4. The method of claim 1, wherein said data blocks and said error correction code blocks are of substantially uniform size.

5. The method of claim 1, wherein said data blocks and said error correction code blocks are nonuniform in size.

6. The method of claim 1 wherein the step of defining each data envelope includes the step of writing an envelope identifier value for identifying said envelope in each block of an entity included within said envelope.

7. The method set forth in claim 1 wherein the step of closing the variable length present data envelope comprises the step of writing a next preliminary data envelope onto the plural lineal tracks adjacently sequential of the variable length present data envelope.

8. The method set forth in claim 1 wherein the plural rows and plural lineal data tracks comprise at least three rows and three data tracks, and the step of rewriting the block determined to be in error to a different row comprises the step of relocating said block to a circularly adjacent track.

9. The method set forth in claim 8 wherein the plural rows and plural lineal tracks comprise four rows and four tracks.

\* \* \* \* \*